United States Patent [19]

Taylor et al.

[11] 4,412,319

[45] Oct. 25, 1983

[54] VIDEO DISC PLAYER WITH SELF CALIBRATING STYLUS TRANSLATOR

[75] Inventors: Bryon K. Taylor, Carmel, Ind.; George H. N. Riddle, Princeton, N.J.

[73] Assignee: RCA Corporation, New York, N.Y.

[21] Appl. No.: 283,051

[22] Filed: Jul. 13, 1981

Related U.S. Application Data

[63] Continuation of Ser. No. 86,246, Oct. 18, 1979, abandoned.

[51] Int. Cl.³ .................. G11B 7/00; G11B 15/52; H04N 5/76
[52] U.S. Cl. ................................ 369/43; 369/49; 358/342
[58] Field of Search ............ 369/43, 47, 49; 360/77, 360/78, 72.2; 358/342

[56] References Cited

U.S. PATENT DOCUMENTS

| | | | |
|---|---|---|---|
| 3,662,350 | 5/1972 | Chertok | 179/100.4 D X |
| 3,963,860 | 6/1976 | Burrus | 179/100.4 D X |
| 3,963,861 | 6/1976 | Crooks | 179/100.4 D X |
| 3,973,080 | 8/1976 | Dickopp et al. | 170/100.4 D X |
| 3,993,863 | 11/1976 | Leedom et al. | 178/6.6 |
| 4,000,510 | 12/1976 | Cheney et al. | 360/72.2 X |
| 4,094,013 | 6/1978 | Hill et al. | 179/100.1 G X |
| 4,106,058 | 8/1978 | Romeas et al. | 179/100.3 V X |
| 4,152,727 | 5/1979 | Tatsuguchi et al. | 360/77 X |
| 4,159,480 | 6/1979 | Tachi | 358/8 |
| 4,167,759 | 9/1979 | Tachi | 360/72.2 X |
| 4,170,783 | 10/1979 | Tajima | 369/43 |
| 4,176,378 | 11/1979 | Toda et al. | 360/DIG. 1 X |
| 4,183,059 | 1/1980 | Palmer | 179/100.4 D X |
| 4,198,658 | 4/1980 | Falmer | 358/128.6 |
| 4,199,820 | 4/1980 | Ohtake et al. | 360/78 X |
| 4,258,233 | 3/1981 | Simshauser | 369/43 X |

FOREIGN PATENT DOCUMENTS

| | | |
|---|---|---|
| 2225804 | 11/1974 | France . |
| 2409572 | 6/1979 | France . |
| 1469483 | 4/1977 | United Kingdom . |
| 2021841 | 12/1979 | United Kingdom . |

OTHER PUBLICATIONS

"VIR II System", IEEE Transactions on Consumer Electronics, vol. CE-24, No. 3, pp. 200-208, Au. 78.
Millman and Taub, "Pulse, Digital and Switching Waveform", McGraw Hill, N. Y. 1966, pp. 517 et seq.
"Analog-Digital Conversion Handbook", by Analog Devices Eng'r. Staff, Analog Devices, Norwood, Mass. 1972, pp. II-34 et seq.
The American Heritage Dictionary of the English Language ©1969, p. 190.

*Primary Examiner*—Aristotelis M. Psitos
*Attorney, Agent, or Firm*—E. M. Whitacre; J. S. Tripoli; E. P. Herrmann

[57] ABSTRACT

An adaptive video disc record stylus kicker system for inducing limited stylus translation radially across the disc record. Control circuitry responsive to track identification signals recorded on the disc and to player commands evaluates the error between actual kicker induced stylus translations and the programmed kicker induced stylus translations to calibrate the stylus kicker drive signals.

4 Claims, 9 Drawing Figures

VIDEO DISC PLAYER WITH SELF CALIBRATING STYLUS TRANSLATOR

This is a continuation of application Ser. No. 86,246, filed Oct. 18, 1979, now abandoned.

This invention relates to apparatus utilized in the playback of a video disc record and more particularly to apparatus for repositioning a player signal pickup stylus from one convolution of a signal encoded information track disposed on the disc to another.

Certain capacitive video disc systems incorporate record discs with information recorded by means of geometric variations in a conductive medium disposed proximate the bottom of a smooth spiral groove on the surface of a record disc. The bulk of the record disc may comprise a homogeneous conductive material with a thin dielectric layer disposed on its outer surfaces. A pickup or signal stylus supported at one end of a stylus arm, and having a conductive electrode engages and tracks the groove. The stylus electrode and conductive record material form a capacitance, which capacitance varies spatially over the record in accordance with the geometric variations in the bottom of the groove. Continuous capacitive changes resulting from rotating the disc to produce relative motion between the stylus and disc are detected and processed to produce video and/or audio signals for reproduction.

Video disc systems of the aforementioned type may utilize disc records having groove densities in the order of four to eight thousand groove convolutions per inch, and in some cases, close to ten thousand groove convolutions per inch. A typical video disc record of this type may have a groove convolution spacing in the order of 2.7 microns. The fragile walls of relatively narrow grooves of the disc record cannot be dependably relied upon to pull the weight of the pickup arm assembly, around the pickup arm pivot support, across the entire recorded surface of the disc record. Also in video disc systems utilizing the variable capacitor concept, it is desirable for accurate reproduction of the prerecorded signals that the signal pickup electrode maintain a substantially constant attitude in the spiral groove. Therefore, the supporting structure includes radial feed drive mechanism for transversing the supported end of the pickup arm in proper time relationship with the radial motion of the signal pickup tip engaged in the spiral groove so as to continuously maintain the longitudinal axis of the pickup arm substantially tangential to the spiral groove at the point of engagement.

Disc records having high groove densities are subject to occasional flaws causing premature termination of the spiral groove. Such premature termination frequently causes an outward translation of the stylus resulting in an undesired and annoying repetition of a particular groove convolution during disc playback (referred to as a locked groove). In order to correct for such outward stylus translation, certain playback apparatus incorporate systems for determining the occurrence of a locked groove and also incorporate a mechanism for imparting an inward motion to the stylus relative to the pickup arm support assembly. See for example U.S. Pat. No. 3,963,861 entitled, "Disc Record Groove Skipper Apparatus", U.S. Pat. No. 3,963,860 entitled, "Locked Groove Detection and Correction in Video Disc Playback Apparatus", and U.S. Pat. No. 4,183,059 filed May 22, 1978, entitled, "Track Skipper for a Video Disc Player", and assigned to the same assignee as the present invention for representative stylus skipping mechanisms.

Because the dimensions of the stylus, groove, and groove pitch, etc., are particularly small and the dimensions of the stylus arm, carriage, disc record and the kicker mechanisms, etc. are relatively large, provision for mechanical adjustment of each kicker assembly with respect to its associated stylus assembly is desirable. This provision does not account for variations in the physical dimensions of grooves from disc record to disc record.

The present invention incorporates a means to automatically adapt each kicker apparatus to its associated stylus assembly and to the particular disc record being played. To facilitate kicker adaptation, groove identification signals are included in the information recorded on the disc. Control circuitry responsive to an interruption of progressive incrementing of the identification signals, actuates a programmable pulse generator to drive a stylus kicker mechanism in the appropriate direction. The pulse generator produces a first pulse of nominal amplitude to the kicker. Depending upon the resulting stylus translation or lack thereof, the pulse generator is adjusted by the control circuitry to increase (decrease) the pulse amplitude in prescribed increments (decrements) until the desired translation is acquired for a single applied pulse to the kicker. The resulting pulse amplitude is thereafter established as the nominal value for the particular record disc being played.

Figure 1:
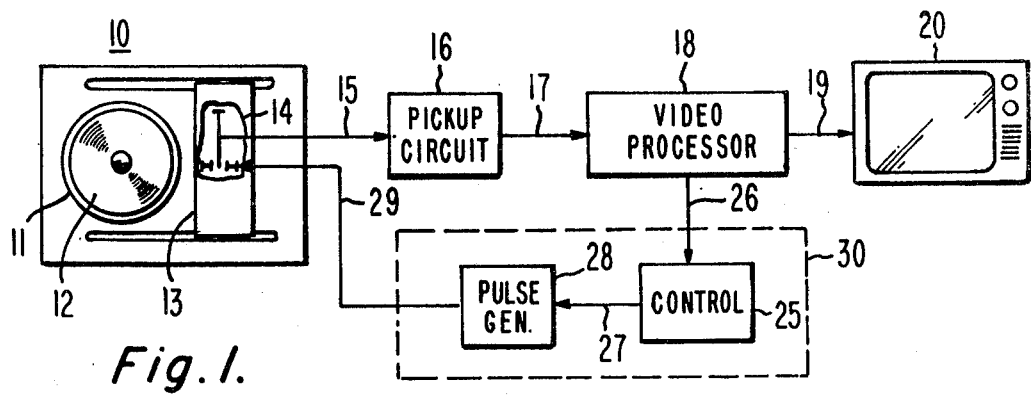
FIG. 1 is a block diagram of a record disc playback system including an adaptive kicker.

In the video disc playback system of FIG. 1, player 10 has a turntable 11 for rotatably supporting a record disc 12 having an information track which may be spiral or concentric in form. Each track or convolution of the spiral track on the disc contains picture signal information inclusive of synchronization components plus information identifying the particular track. A stylus assembly 14 including a signal pickup stylus and a kicker apparatus, for imparting motion to translate the pickup stylus over one or more convolutions of the groove, is mounted in the carriage mechanism 13 for radial translation of the stylus assembly across the record. Capacitance variations occurring between the stylus and the disc record are detected by pickup circuits 16 and applied to the video processor 18 to format the signal for display by a conventional TV receiver 20. Control circuitry 25, responsive only to the track identification signal monitors the track numbers. Upon the occurrence of an undesired or anomalous stylus progression the control circuitry 25 applies a signal of a prescribed nominal value (analog or digital signal) to the pulse generator 28. Pulse generator 28 generates a pulse of appropriate shape and/or amplitude to energize the stylus kicker to translate the stylus a desired number of convolutions. If the stylus fails to move or skips too many convolutions the control circuitry 25 respectively increments or decrements the control signal value and initiates a further kick. The controller iterates through this process until the proper control signal is established to accomplish the particular stylus translation desired.

Several options are available regarding the time and manner of providing such adaptive stylus movement. A first method is to perform kicker adaptation immediately upon the stylus engaging the record disc in a pre-play band having information recorded for calibrating the player. Once the control pulse parameters are established they constitute fixed constants for the remainder of play of the particular disc.

A second method is to incorporate calibration of the kicker system as described immediately above with the added flexibility of having the system readapt the control pulse parameters whenever a kick produces improper results.

A third method is to have the system calibrate upon the first occurrence of an abnormal stylus progression.

A fourth method is to partially calibrate the kicker system for each occurrence of an abnormal stylus progression.

Figure 2:
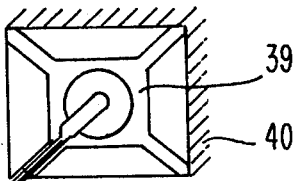
FIG. 2 is a diagrammatic representation of a stylus-arm assembly having an electromagnetic kicker apparatus.
Figure 2:
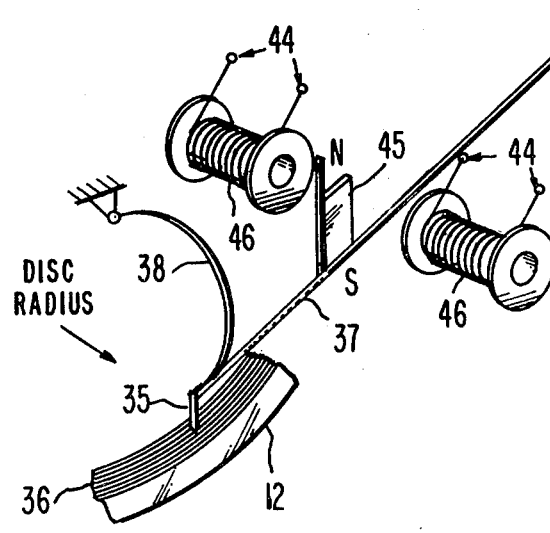

FIG. 2 illustrates a stylus-kicker assembly. A stylus 35 having a signal pickup electrode thereon is contoured to engage the grooves 36 of record 12. Electrical contact to the electrode is made via flylead 38. The flylead 38 also produces a degree of pressure between the stylus and the record. Stylus 35 is mounted to the free end of stylus arm 37, the opposite end of which is attached to the carriage assembly 40 by a compliant coupling 39 which permits limited freedom of movement of the stylus arm in three dimensions. A permanent magnet 45 is fixedly mounted to the stylus arm 37 relatively near the stylus and arranged so that substantially only one pole such as the North pole is immersed in the magnetic field lines emanating from the selectively energized electromagnets or coils 46 when the stylus is in the play position. The coils 46 having nonmagnetic cores are elecrically connected to produce aiding fields to impart a radial movement to magnet 45 and consequently movement of the stylus when the coils are energized.

Figure 3:
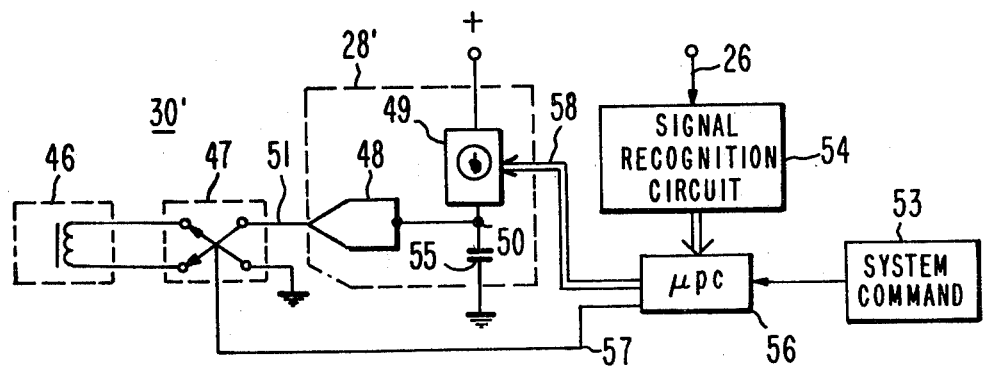
FIG. 3 is a block diagram of an adaptive stylus kicker system.

The partial schematic-partial block diagram of FIG. 3 illustrates an adaptive kicker system for the player 10. In FIG. 3 a microprocessor 56, assumed to include the requisite associative circuitry for normal operation responsive to system or program commands (53) from the player controls, monitors the stylus position via track identification signals and applies inward or outward kick signals in accordance with the mode of playback. For example, if a particular video frame is to be "frozen", at that point in the record playback, the stylus is kicked one convolution or track outward for each revolution of the disc. Where one frame is recorded in each convolution, nothing more need be done. Where several frames are recorded per convolution, additional apparatus may be used to avoid flicker in the output display. The microprocessor 56 receives track identification signals from the recognition circuit 54, calculates the proper stylus position and current errors in the stylus position and determines appropriate control signal adjustments to apply to the programmable pulse generator 28' and the switch 47 to reposition the stylus in the direction of the proper or the desired track. The pulse generator 28' produces a ramped voltage proportional to the control signal applied by the microprocessor via input bus 58. The pulse generator output signal at connection 51 is applied to the reversing switch 47 for application to the stylus kicker coil 46. The reversing switch 47, controlled by the microprocessor 56 via bus 57 governs the direction of current flow through the stylus kicker coil 46 and thereby the direction of the magnetic field created between the coils and consequently the direction of stylus movement.

The pulse generator 28' includes a current source circuit 49 providing a high impedance regulated current in a first mode and a low impedance connection to a reference potential in a second mode. When the current source is operated in the second mode the potential across capacitor 55 is clamped at the reference potential. Switching the current source 49 to its first mode causes the potential at connection 50 to monotonically increase in accordance with the charging rate of capacitor 55, i.e., $$V = 1/C \int I\, dt \approx It/C \tag{1}$$

where I is the amplitude of the current supplied by source 49, C is the capacitance value of capacitor 55 and t is the charging time.

The potential at connection 50 is buffered by amplifier 48 which generates the requisite range of output currents to drive the stylus kicker coil 46.

Figure 4A:
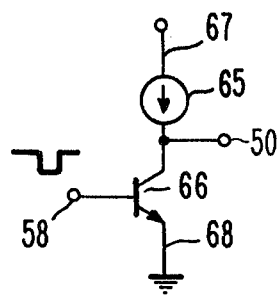
FIGS. 4A and 4B illustrate programmable current sources.

A particular embodiment of the current source 49 is illustrated in FIG. 4A. A conventional current source 65 is serially connected in the collector circuit of transistor 66 between supply terminals 67 and 68. A positive control potential with respect to supply terminal 68, applied to control input 58 causes the transistor 66 to conduct, shunting all the current, I, from source 65 to terminal 68. A negative control potential turns transistor 66 off making the current I, available at output connection 50.

Figure 5A:
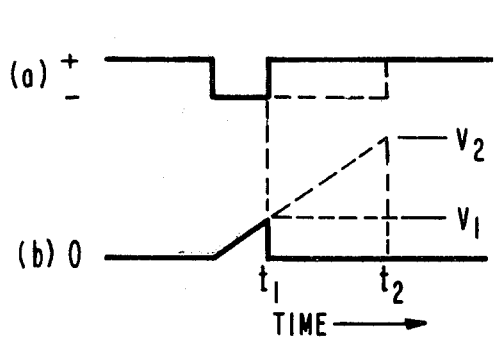
FIGS. 5A and 5B are graphic representations of the output signal responses for the pulse generator circuit of FIG. 3 respectively with the circuits of FIGS. 4A and 4B substituted for the programmable current source.

FIG. 5A illustrates the response of the programmable pulse generator 28' with the FIG. 4A circuit employed as the current source circuit. FIG. 5A(a) illustrates the control pulse applied to the pulse generator and 5A(b) the pulse generator response. From equation (1) it is seen that for a particular constant current I, the duration "t" of the control pulse programs the output amplitude "v" of the pulse generator; the wider the negative control pulse the higher the output amplitude of the waveform "v".

Figure 4B:
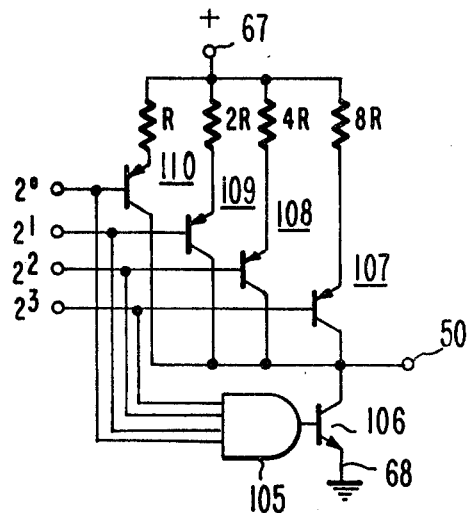

FIG. 4B is a binary programmable current source for producing 16 discreet output current levels. Assuming each of the binary inputs $2^0$-$2^3$ have equal amplitude potentials, the current amplitudes of each of the respective current sources 107 to 110 is determined approximately by the input potential divided by the respective emitter resistor. The currents are summed and made available at connection 50. Since the resistors have binary weights, i.e., R, 2R, 4R, 8R, each of the currents from the respective sources 110, 109, 108 and 107 have binary weights making the combination a binary programmable current source. Each of the sources 107 to 110 are conditioned to conduct by a logical low signal applied to their respective input connections. Consequently, a high signal applied to all binary inputs $2^0$ to $2^3$ turns the composite current source off and turns transistor 106 on via logical "AND" circuit 105. With transistor 106 conducting, the connection 50 is clamped to the reference potential at terminal 68.

Figure 5B:
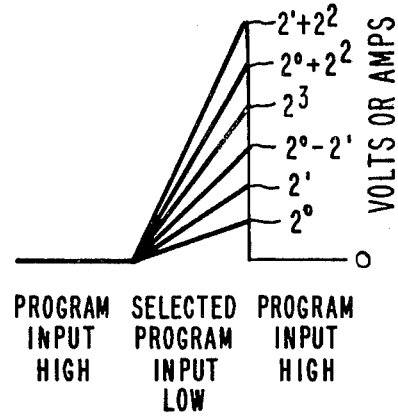

FIG. 5B illustrates the output response of the programmable pulse generator 28' with the FIG. 4B circuit implementing the current source 49. In accordance with equation (1) it is noted that for a constant charging or integration time the output signal increases as the magnitude of current I is increased.

Figure 6:
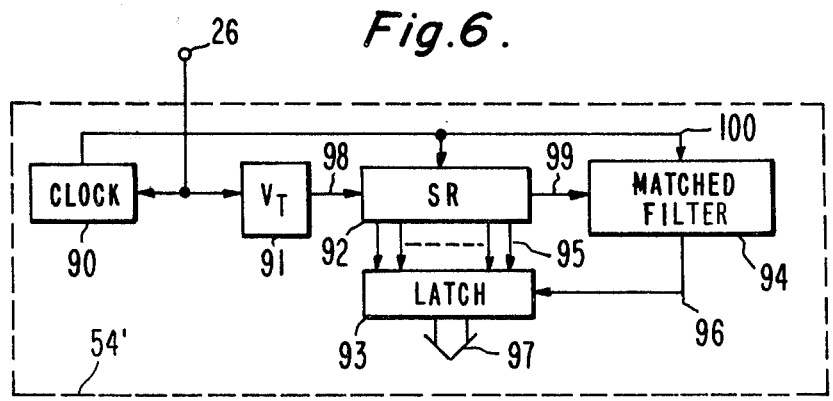
FIG. 6 is a block diagram of an embodiment of the signal recognition circuit of FIG. 3.

The recognition circuit 54' shown in FIG. 6 provides identification data recorded in a particular format for use by the microprocessor. Consider, for example, a video disc in which information is recorded in a generally NTSC format having vertical and horizontal blanking intervals. Normally, the first 21 horizontal lines of each field of display contain no usable video information, thus that portion of a field may be used to contain track identification information. If there exist more than one field per track or convolution, and the fields are radially aligned from track to track so that each field of a track defines an angular sector of the disc, both track and sector information may be included. By way of example consider a record disc having a spiral groove with eight fields per convolution, the fields from convolution to convolution being aligned in eight 45 degree sectors. Assume also that on the nineteenth horizontal line of each field that a digital signal is recorded inclusive of an N bit recognition signal followed by an M bit identification signal. The M bit identification signal identifies the convolution and the sector and the N bit recognition signal is used to alert the system that the subsequent M bits comprise useful data, e.g., track numbers. Assume that the maximum bit rate is equal to and synchronized with a fundamental system frequency such as the color burst frequency. Demodulated video signals from the video processor are applied via connection 26 to the clock generator 90 and threshold detector 91. Clock 90 generates a system clock, oscillating at a constant frequency equal to the requisite fundamental frequency and synchronized therewith, suitable for driving logic circuitry. The threshold circuit conditions the video signal, inclusive of the digital information to a two level signal having normal logic level amplitudes. The signal from threshold circuit 91 is sequenced, by the clock signal at connection 100, through the M bit serial-parallel shift register 92 and into the N bit matched filter 94. When η sequential bits of the signal applied to filter 94 match a recognition signal programmed into the filter, the filter 94 outputs a correlation pulse on connection 96. The following M signal bits concurrently contained in register 92 are the track and sector information bits. M bits of information available from M parallel output connections 95 are latched and formatted for use by the microprocessor by LATCH circuit 93 responsive to the correlation pulse occurring on connection 96.

An alternative to using a rcognition signal (code), to prompt the system, is to use circuitry to recognize the particular horizontal line in which the track identification information is recorded. One such system is described in the article "VIR II System" by S. K. Kim, published in the IEEE Transactions on Consumer Electronics, Vol. CE-24, No. 3, August 1978.

The FIG. 3 calculating means is illustrated as a microprocessor 56, though it may be implemented with a less powerful circuit or system dedicated solely to the task of generating the proper energization of a kicker assembly to achieve a desired stylus translation.

Figure 7:
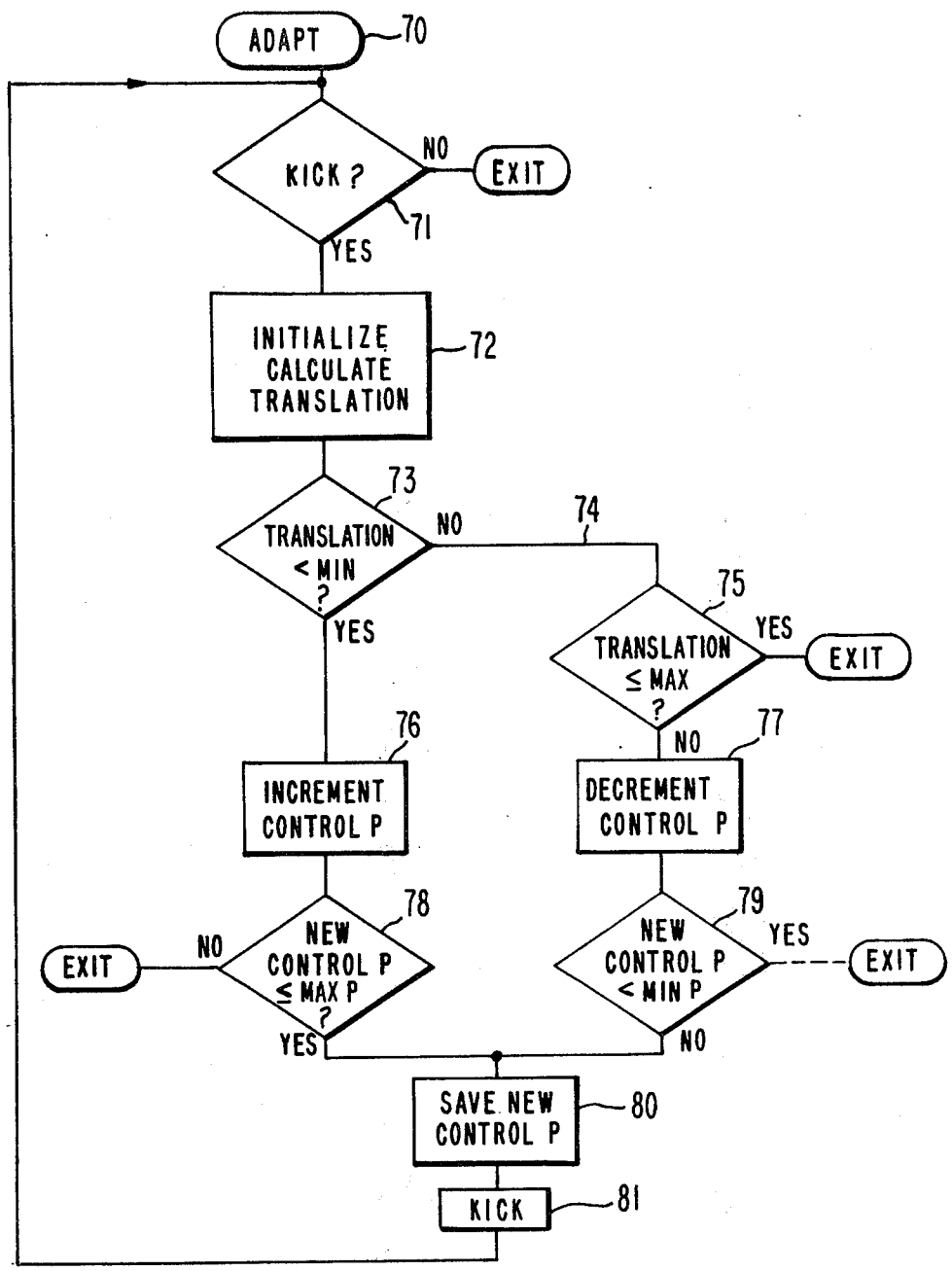
FIG. 7 is a flow chart illustrating a sequence by which the system of FIG. 3 adapts the stylus kicker to the physical parameters of the player/record system.

An illustrative sequence of events for determining the necessary kicker drive parameters is outlined by the FIG. 7 flow chart. The routine does not include general system monitoring and kick control. This particular routine assumes that adaptive parameters will be generated on the first occurrence of a stylus kick and every kick thereafter which produces an improper stylus translation.

Once the adaptive sequence is initiated a first decision point 71 determines whether the system attempted a kick. If a kick was not attempted the system has no measured values to determine the performance of the kicker and the system exits the adaptive program. If a kick was attempted the system initializes (72) on the current groove convolution being tracked and calculates the number of groove convolutions skipped by subtracting the last-most previously detected groove convolution number from the current number. The system orients to whether an inward or outward kick was performed and whether an inward or outward stylus translation occurred. Having established these circumstances the particular kick control parameters are accessed for possible alteration.

A decision point (73) compares the immediate stylus translation with the minimum value programmed for the particular kick. If the stylus translation is less than the minimum set for the translation range programmed, the kicker control parameters are incremented (76), i.e., the parameters are adjusted to produce a kick greater than the previous kick. Each increment to the control parameters may be a fixed constant, or for calculating means of sufficient computational power, the increments may be proportioned to the stylus translation error.

Once the control parameters are incremented, the new parameters are checked against a preset maximum (78). If the parameters equal or exceed the maximum, the routine is exited to preclude the system for performing an endless iteration possibly damaging the player or the disc record. On the other hand if the new control parameters are within the acceptable maximum limit, the incremental parameters are established (80) as the kicker control values for the kick corresponding to the particular program command. The system then initiates a kick (81) to iterate the routine.

At decision point 73 a stylus translation exceeding the minimum causes a branching to decision point 75 which determines whether the stylus translation exceeded a preset range maximum. If it has not, then the system assumes it is operating with proper control parameters and the kicker adaptation is complete for the particular program command. If the stylus translation exceeds the maximum, the control parameters are decremented (77) or adjusted to produce a lesser kick. The decremental parameters are checked against a preset minimum and saved (80) if they are in the acceptable range or else the routine is exited to prevent damage to the system.

A table of control parameters is maintained for each particular type of kick since the kicker requirements for different conditions may differ. The stylus arm dynamics for inward movement differ from the dynamics for outward movement as a result of inherent mechanical bias. Thus the kicker force and accordingly the kicker control parameters differ for inward and outward stylus translation. Additionally, a K groove inward stylus translation will necessitate different drive parameter than an H groove inward stylus translation, etc., where K and H are arbitrary integers.

Armed with the foregoing, one skilled in the art of automatic control systems may readily devise variations of the invention without straying from the spirit of the invention and the claims should be construed in this light. For example, the particular pulse generator described may be substituted for by a programmable voltage source where the particular track skipper utilized is responsive to voltage signals. Also, the program sequence described by the flow chart is easily modified to include more or less system checks or functions.

What is claimed is:

1. In combination with a disc record player mechanism for recovering recorded information from disc records having information bearing tracks thereon, the recorded information including track identification signals, said player mechanism including circuitry responsive to user operated controls for generating player program commands, said player mechanism further including a track following signal pickup stylus cooperating with pickup circuitry for recovering the recorded signals, the signal pickup stylus being mounted to a first end of a stylus arm, the second end of which is supported by a compliant coupling in a carriage mechanism for translating the signal pickup stylus radially across the disc record, an adaptive stylus translating system for translating the stylus relative to said carriage mechanism comprising:
   a transducer responsive to drive signals for selectively imparting stylus translation relative to said carriage mechanism and in a direction radially across said record;
   a programmable pulse generator for generating incrementally variable drive signals in response to control signals for application to the transducer;
   control circuitry responsive to said recovered track identification signals and to player program commands for generating and calibrating said control signals including;
   (a) means for providing a nominal control signal for generating a drive signal to produce a prescribed transducer induced stylus translation;
   (b) means responsive to recovered track identification signals for determining errors between the stylus translation induced by the transducer in response to said nominal control signal and said prescribed translation; and
   means for adjusting the nominal control signal to reduce said errors thereby producing a corrected nominal control signal, said corrected nominal control signal inducing transducer produced stylus translations equal to the prescribed translation.

2. The combination as set forth in claim 1 wherein the transducer comprises:
   a permanent magnet secured to the stylus arm near the first end thereof;
   a pair of spaced coils having non-magnetic cores for providing a magnetic field therebetween upon application of drive signals thereto; and
   means for mounting said pair of coils in fixed relation to said carriage such that said permanent magnet is disposed therebetween.

3. The combination set forth in claim 1 or 2 wherein the control signal produced by the control circuitry is a pulse of selectable duration and the programmable pulse generator develops a drive signal proportional to the duration of said control signal.

4. The combination set forth in claim 1 or 2 wherein the control signal produced by the control circuitry is a binary coded signal and the programmable pulse generator develops a drive signal proportional to the value of the binary signal.

* * * * *

UNITED STATES PATENT AND TRADEMARK OFFICE
CERTIFICATE OF CORRECTION

PATENT NO. : 4,412,319

DATED : Oct. 25, 1983

INVENTOR(S) : Byron K. Taylor et al.

It is certified that error appears in the above-identified patent and that said Letters Patent is hereby corrected as shown below:

Page 1     "[75] Inventors: Bryon K. Taylor, Carmel, Ind.;" should be --[75] Inventors: Byron K. Taylor, Carmel, Ind.;--.

Col. 1, line 41     "ofthe" should be --of the--.

Col. 1, line 44     after "includes" insert --a--.

Signed and Sealed this

Eighth Day of May 1984

[SEAL]

Attest:

GERALD J. MOSSINGHOFF

Attesting Officer     Commissioner of Patents and Trademarks